(12) United States Patent
Rapp et al.

(10) Patent No.: US 6,615,177 B1
(45) Date of Patent: Sep. 2, 2003

(54) MERGING OF SPEECH INTERFACES FROM CONCURRENT USE OF DEVICES AND APPLICATIONS

(75) Inventors: Stefan Rapp, Fellbach (DE); Silke Goronzy, Fellbach-Schmiden (DE); Ralf Kompe, Fellbach (DE); Peter Buchner, Kirchheim/Teck (DE); Franck Giron, Fellbach (DE); Helmut Lucke, Tokyo (JP)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/546,768

(22) Filed: Apr. 11, 2000

(30) Foreign Application Priority Data

Apr. 13, 1999 (EP) .......................................... 99 107 201

(51) Int. Cl.$^7$ .............................................. G10L 21/00
(52) U.S. Cl. ...................................... 704/277; 704/270
(58) Field of Search ................................ 704/277, 270

(56) References Cited

U.S. PATENT DOCUMENTS 5,890,123 A * 3/1999 Brown et al. ................ 704/235
5,983,190 A * 11/1999 Trower et al. ............... 704/275
6,144,938 A * 11/2000 Surace et al. ................ 704/257

FOREIGN PATENT DOCUMENTS

EP           0 911 808      4/1999
WO          WO 98 31007    7/1998

OTHER PUBLICATIONS

Evans G: "Solving Home Automation Problems Using Artificial Intelligence Techniques" IEEE Transactions on Consumer Electronics, vol. 37, No. 3, Aug. 1, 1991, XP000263213.

VoxML 1.0 Language Reference, Sep. 1998.

Sproar et al. "A Makup Language for Text–To–Speech Synthesis" (Date unknown).

Aust et al. "An Overview of the Philips Dialog System" (Date unknown).

* cited by examiner

Primary Examiner—Doris H. To
Assistant Examiner—Michael N. Ofsasnick
(74) Attorney, Agent, or Firm—Frommer Lawrence & Haug LLP; William S. Frommer; Dennis M. Smid

(57) ABSTRACT

According to the present invention network devices that can be controlled via a speech unit included in the network can send a device-document describing its functionality and its speech interface to said speech unit. The speech unit combines those documents to a general document that forms the basis to translate recognized user-commands into user-network-commands to control the connected network-devices. A device-document comprises at least the vocabulary and the commands associated therewith for the corresponding device. Furtheron, pronunciation, grammar for word sequences, rules for speech understanding and dialog can be contained in such documents as well as the same information for multiple languages or information for dynamic dialogs in speech understanding. It is possible that one device contains several documents and dynamically sends them to the speech unit in case they are needed. Furtheron, the present invention enables a device to change its functionality dynamically based on changing content, since a network device send its specifications regarding its speech capabilities to the speech unit while the speech unit is in use.

24 Claims, 3 Drawing Sheets

MERGING OF SPEECH INTERFACES FROM CONCURRENT USE OF DEVICES AND APPLICATIONS

BACKGROUND OF THE INVENTION

1. Field of the Invention

This invention relates to a speech interface in a home network environment that can dynamically and actively extend its vocabulary on basis of device or medium dependent vocabulary transmitted by network devices. In particular it relates to a method of extending the vocabulary within a speech unit realizing such a speech interface.

In this context, a device can either be hardware, e.g. a VCR, or software, e.g. an electronic programming guide.

2. Description of the Related art

The EP-A-97 118 470 describes that in a home network environment a device can send its vocabulary describing its functionality and its speech interface to a speech unit. The speech unit can then translate a received and recognized user utterance into a corresponding user-network-command to control said network device on basis of the received vocabulary.

In September 1998 Motorola published a language reference to VoxML 1.0 which is a language based on XML. This language is used for describing dialog systems by specifying dialog steps that consist of prompts and a list of possible options in general. Basically, VoxML offers the same ease of production to voice applications as HTML does as a vehicle for the presentation of rich text as well as images, hypertext links and simple GUI input controls. The VoxML language reference contains information on the syntax of the elements and their attributes, example usage, the structure of VoxML documents or dialogs and pointers to other reference documentation that may be helpful when developing applications using VoxML.

Similarly, the paper "a markup language for text-to-speech synthesis" by Richard Sproat et al. ESCA. Eurospeech 97, Rhodes, Greece, ISSN 1018-4074, page 1774 discloses a spoken text markup language (STML) to provide some knowledge of text structure to text-to-speech (TTS) synthesizers. The STML text can e.g. set the language and default speaker for that language in a multi-lingual TTS system so that appropriate language and speaker specific tables can be loaded.

Furtheron, Phillips has developed a dialog description language called HDDL specifically for the kind of dialogs that are encountered in automatic enquiry systems. HDDL is used to build a dialog system in off-line mode before it is sold.

SUMMARY OF THE INVENTION

The object underlying the present invention is to provide a method to transmit the functionality and speech interface of a network device to the speech unit of the network and to handle such functionalities and speech interfaces of several network devices within the speech unit.

Therefore, the present invention provides an easy, quick and flexible method to control a network device connected to a network with a speech unit within said network that translates user-commands into user-network-commands to control said network device via said network on basis of the functionality and a speech interface that comes e.g. with said network device.

The inventive method is defined in independent claim 1, preferred embodiments thereof are respectively defined in the following dependent claims 2 to 24.

According to the present invention, every network device connected to a network is associated with at least one device-document that defines the functionality and speech interface of said network device. Such a device-document can come e.g. without said network device and comprises one or several pairs of an user-command interpretation element and an associated user-network-command. Furtheron, the speech unit is able to receive such device-documents and merge them together into one speech interface description. This speech interface description comprises then the language of said speech unit. It can also be referred to as a general document for the whole network. The spoken user-commands that are received and recognized by the speech unit are then translated into user-network-commands on basis of all pairs of an user-command interpretation element and an associated user-network-command included in said general document. Such an user-command interpretation element can e.g. comprise a vocabulary element, a definition of a grammar, a pronunciation definition or several of these or other examples.

As described in EP-A-97 118 470, documents for devices might alternatively be fetched by the speech unit from its own memory or a (distant) database.

The adapting of the general document within the speech unit can be done purely syntactically at runtime after a device-document is received from a device. Of course, it is also possible that a network device comprises several documents that individually describe a part of its functionality and a part of its speech interface and only those documents are transferred to the speech unit that are really needed, e.g. only those documents describing the functionality of a network device for a certain language or only documents that define a part of the functionality of the network device. If the speech unit or an individual network device itself then recognizes that further speech capabilities of said individual device are needed, e.g. an additional language, the corresponding device-document(s) can be send to the speech unit that adapts its general document on basis of this further document and can generate the corresponding user-network-commands on basis of the adapted general document at run-time.

The present invention and its advantages will be better understood from the following description of exemplary embodiments thereof. These subsequent discussed embodiments are described on basis of a case where two devices are connected to a network that also includes one speech unit. Initially, the general document of the speech unit is empty and both device-documents each of which defines the language of one device are merged together into one interface description within the speech unit. Obviously, these examples can be extended to a case with n devices being connected to a network or also for the case that the speech unit comprises a general document that gets adapted on basis of a newly received device-document. Furtheron, for the sake of simplicity, a device document comprises user-command interpretation elements consisting only of one vocabulary-element.

DETAILED DESCRIPTION OF THE INVENTION

In the following examples L1 is the accepted language, i.e. the vocabulary-elements and associated commands, of a first device 1 and L2 that of a second device 2. Mathematically speaking, L1 is a set of at least one vocabulary-element, i.e. word $w_i$ (although a word $w_i$ needs not to be a single word, it could also be a complete utterance consisting of several words), and the associated user-network-command. Additionally to the vocabulary-elements for example elements about pronunciation, grammar for word sequences and/or rules for speech understanding and dialog can be contained in the language.

In a first example L1 and L2 contain no same vocabulary-elements, i.e. no same words, so that L1∩L2={ }, the merged accepted language L for the interface description is L=L1∪L2. i.e. the general document within the speech unit is built by adding the pairs of vocabulary-elements and associated commands from document 1 comprising the language L1 of the first device 1 and document 2 comprising the language L2 of the second device 2. As the vocabulary-elements together with the associated commands implicitly define for which device they were meant, since L1 and L2 contain no same vocabulary-elements, user network commands can be generated and sent to the correct corresponding devices.

In this first example the two network devices might be a TV set and a CD player. In this case L1 associated with the TV set and L2 associated with the CD player respectively comprise the following vocabulary-elements within the device-documents:

L1={MTV, CNN}, and

L2={play, stop}.

Since L1 and L2 do not contain the same vocabulary-elements, i.e. L1∩L2={ }, the merged accepted language L of the interface description is L=L1∪L2={MTV, CNN, play, stop}. For example, these vocabulary-elements are respectively associated with a user-network-command having a functionality as proposed in the following list:

MTV→<switching TV to MTV>,

CNN→<switching TV to CNN>, play→<put CD into play mode>, and stop→<put CD into stop mode>.

However, if the two devices share similar vocabulary-elements, i.e. same words, so that L1∩L2≠{ }, according to the present invention, they are made distinguishable. In a first preferred embodiment of the present invention the device name will be prefixed and/or appended to at least those vocabulary-elements that build the intersection in between the respective accepted languages, i.e. in between L1 and L2. Therefore, the user has to prefix and/or append the spoken user-command within the name of the respective device he/she wants to address. As mentioned above, if the command is not confusable, the device name need not to be prefixed, but may be.

In the following second example a respective command will be prefixed with the name of the device and the new language L that builds the interface description is the union of the non-confusable words of both languages and the languages of the devices prefixed by their device names (respectively called n1 and n2 in the following formula):

$$L=L1\backslash(L1\cap L2)\cup L2\backslash(L1\cap L2)\cup n1\ L1\cup n2\ L2$$

The following second example will clarify the inventive method according to this embodiment with the help of a network comprising a CD player and a tapedeck, respectively named "CD" and "Tape". The accepted language L1 of the CD player and the accepted language L2 of the tapedeck respectively comprise the following vocabulary-elements:

L1={Play, Stop, Skip}, and

L2={Play, Record, Stop, Rewind}.

The accepted language L of the speech interface is L=(L1\(L1∩L2))∪(L2\(L1∩L2))∩n1 L1∩n2 L2={Skip, Record, Rewind, CD Play, CD Stop, CD Skip, Tape Play, Tape Record, Tape Stop, Tape Rewind}. The functionality of the associated user-network-commands could be:

Skip→<skip to next track on CD>,

Record→<go to record mode for tape>,

Rewind→<rewind the tape>,

CD Play→<go to play mode for CD>,

CD Stop→<stop playing the CD>,

CD Skip→<skip to next track on CD>,

Tape Play→<go to play mode for tape>,

Tape Record→<go to record mode for tape>,

Tape Stop→<stop to play/record the tape>, and

Tape Rewind→<rewind the tape>.

According to a second preferred embodiment of the present invention, the "same words problem" is solved by automatically sending a query to the user to clarify the device the user wants to address in case of a recognized ambiguous command. Formally, the accepted language of such a scenario is the same as with the disjunct languages in the first example, but the interpretation changes. A third example that is used to clarify this embodiment is based on the scenario given in the second example, i.e. a CD player and a tapedeck as network devices. The accepted language L is build as in the first example, i.e. L=L1∪L2, but under the condition that a selection procedure is performed when recognizing a vocabulary-element that is included in the intersection of the languages L1 and L2. Under the condition that L1 and L2 respectively comprise the same vocabulary-elements as in the second example, the accepted language L of the speech unit comprises the following vocabulary-elements: L={Play, Stop, Skip, Record, Rewind}. The functionalities of the associated user-network-commands in this case are:

Play→<clarify 1>,

Stop→<clarify 2>,

Skip→<skip to next track on CD>,

Record→<go to record mode for tape>, and

Rewind→<rewind the tape>, where "clarify 1" means that the speech recognizer outputs the query "on what device?" and switch the language to La with vocabulary-elements La={CD, Tape} and the functionalities of the associated user-network-commands in this case are:

CD→<go to play mode for CD> and<switch back to L>, and

Tape→<go to play mode for tape> and<switch back to L>, and where "clarify 2" means that the speech unit outputs the query "on what device?" and switch the language to Lb with the vocabulary-elements Lb=La={CD, tape} and the functionalities of the associated user-network-commands in this case are:

CD→<stop playing the CD> and<switch back to L>, and

Tape→<stop play/record the tape> and<switch back to L>.

According to a third embodiment of the present invention, the second embodiment can be accelerated when the speech unit just takes the most recently used device as default device and therefore translates a received and recognized spoken user-command into a corresponding user-network-command on the basis of the general document comprising the accepted language L of said speech unit and the default device. Of course, the possibility is given to put another device into focus again, e.g. by just uttering the name of the device.

According to a fourth embodiment an adaptation of dialog is performed. In the situation as described above, clarifying questions are output to the user to correctly assign ambiguous words and the system observes the reaction of the user. If most of the clarifications yield that the most recently addressed device was meant, the question will be skipped and the user-network-command gets directly issued to that device. Several information sources could be used for predicting for which device a command was given, e.g. not only considering the most recently used device, but also similarities of devices or device classes. For instance, it is more likely that a "record that" command while watching TV is meant for the VCR rather than for an audio tape, while it is the other way round while listening to the radio. It is also possible that device classes could be learned from the user's behaviour or by investigating a functional description of the devices.

According to the present invention, i.e. in all embodiments described above, a device-document can be sent from a device to the speech unit directly after said device was connected to the network or after said device received a user-network-command from the speech unit. It is also possible that the device sends such a device document dependent from its current status to the speech unit. A device can comprise more then one document or devices might change their functionality dynamically based on changing content information and might therefore update the dialog and speech understanding capabilities when they observe a change or regularly by sending new documents to the speech unit. It is also possible that a device-document is not stored within the corresponding device, but within a device-document supply device, e.g. within an internet-server of the manufacturer of the device. In this case the speech unit might download the device document after it recognizes that said device got connected to the network.

It is for example also possible that a device contains several documents each including the whole accepted language of the whole device in a language of a different country. Therefore, such a device can e.g. first send a device-document for German speakers to the speech unit and after a corresponding command from a user it can send later on a device-document for English language to the speech unit so that the speech unit can translate either German or English user commands into user-network-commands to control the device.

Apart from vocabulary-elements also pronunciation definitions for words used in recognition or synthesis can be included in the elements of device-documents and therefore can be merged straight forward into the general document of the speech unit. When pronunciation definitions are included in a language they can either be solely used for the recognition and synthesis parts for one device or they can be shared for all devices, i.e. a pronunciation introduced by the first device 1 is also valid for the words being uttered for the second device 2 or any other device connected to the network.

Also for synthesis the merging of several device-documents, i.e. the adaptation of the general document in the speech unit is possible. Answers can be given in response to user queries for several devices as well as for a single one. Of course, it must be assured that the synthesis of utterances from several devices is not output concurrently. Some utterances might be caused by an external event, e.g, a warning, based on a supplied priority. They can interrput other utterances and after an Inactivity period of the user the interrupted utterance is re-introduced and the dialog can continue. Managing several streams of dialog in paralell relies on the fact that all streams are active during user inputs and a stream to which the user's utterance is considered the most likely to match to is continued.

The general document of the speech unit can initially either be empty or it can include a basic set of elements describing interfaces for one or for various devices. In the latter case, a document sent from a device to the speech unit may be underspecified and (only) contain references to such parts of the general document.

For example, it is possible that a default grammar for the wording of utterances is included in the basic set of user-command interpretation elements of the general document while just the dialog grammar for a particular device is specified in the device-document. On the other hand, it is also possible that the speech recognizer contains a full description of a certain functionality in its general document, e.g. a full description of how to control an electronic program guide by spoken dialog. In this case, the dialog grammar and a grammar for the word sequence may contain variables for programm titles, director names, actor names, time and date information and so on and the document sent from the electronic programm guide device to the speech unit just contains the information to fill in these variables.

In another embodiment the device document sent from a device to the speech unit just contains keywords associated with network commands and category identifiers. Based on these category identifiers, the speech unit knows which grammar for the word sequence to take as a specification for possible continuous user utterances. For example, if the keyword is "Voice of America" and the category is "RADIO_STATION" then the user might be allowed to say "I want to listen to voice of America" or "Turn on voice of America" and if the category is "RECORD_RADIO_STATION", the possible user utterances might be "Please record voice of America".

The concept/value pairs that form the basis for speech understanding, e.g. (TIME, 8:00) that are needed to start an action can be included as grammar of a certain device in its device document that is sent to the speech unit to adapt the general document. The device-document describing the speech interface contains rules which define a mapping between word sequences and concepts and how to fill in the values of variables. Furthermore, it contains rules which define a mapping from a set of concept/value pairs to an action, (e.g. COMMAND, "record"), (TITLE, "gone with the wind") and (TIME, 8:00) might indiciate a recording session on a VCR. The dialog may be user-initiated, i.e. the order of the utterances, e.g. "at 8 o'clock" and "the movie gone with the wind", and if the information is given in one or more utterances is left to the user. The system can collect the information necessary to start an action based on the grammar and depending on the user-network-commands sent to a respective network-device this device can send a further document comprising additional grammar to the speech unit so that the speech unit might ask back if information is missing or might be able to assign newly recognized user utterances to further user-network-commands.

Apart from the information concerning vocabulary-elements, pronunciation. grammar for word sequences, rules for speech understanding and dialog as user-command interpretation elements, a device-document can also contain the same information, i.e. vocabulary, pronunciation, grammar and so on for multiple languages assigned to the same or equal user-network-command. This offers users to control the device in any of the languages. As mentioned above, this information can also be included in several device-documents of the same device. This allows to specify the interface of a single speech unit being capable of handling multi-lingual spoken input. The dialog grammar can be selected to be language-independent, because the above-mentioned concept/value pairs are language-independent.

As also mentioned above, the document contains a vocabulary either given explicitly or implicitly by the grammar for the spoken words. For each vocabulary-element, i.e. for each word, optionally one or more pronunciations can be given. If it is not given, it can be generated automatically. However, this is error-prone, especially in the case of proper names, words of foreign languages or abbreviations and if special pronunciations (dialectes or foreign accents) are to be captured. The pronunciation builds the basis for creating a word model inside the recognizer given a set of phone or allophone models.

A device-document might also contain standardized information about the device category, e.g. VCR, and/or about its functionality, e.g. it contains a recordable tape, apart from the user-command interpretation elements and the associated commands to make complex commands that involve more than one device possible. For example, if the user has selected a movie playing some days in the future from the electronic programm guide that is displayed on the TV, he might utter "please record this movie". That means that network commands have to be issued to send the relevant channel, date and time information from the programm guide device to the VCR and a command has to be sent to the VCR to assure that the appropriate recording will be made. A similar case is to copy a movie from one VCR tape to- another. In those cases the speech interface descriptions of the individual devices do normally not define such user utterances. Therefore, the speech unit can adapt its general document on basis of a reasoning part included in a device-document by a reasoning component which provides the speech interface description (including grammar for word sequences and dialog) for this extra-functionality involving more than one device from one device that might be included in one of those complex commands.

Since all information to control the network devices is included in one general document within the speech unit the processing (parsing) is very easy, especially when there are references between the different possible contents of the user-command interpretation elements and/or double information assigned to the same or equal user-network-commands within the general document.

Therefore, according to the present invention network devices that can be controlled via a speech unit included in the network can send a device-document describing its functionality and its speech interface to said speech unit. The speech unit combines those documents to a general document that forms the basis to translate recognized user-commands into user-network-commands with the help of user-command interpretation elements to control the connected network-devices. A device-document might e.g. comprise the vocabulary as user-command interpretation elements and the user-network-commands associated therewith for the corresponding device. Furtheron, pronunciation, grammar for word sequences, rules for speech understanding and dialog can be contained within the user-command interpretation elements of such documents as well as the same information for multiple languages or information for dynamic dialogs in speech understanding. It is possible that one device contains several documents and dynamically sends them to the speech unit in case they are needed. Furtheron, the present invention enables a device to change its functionality dynamically based on changing content, since a network device sends its specifications regarding its speech capabilities to the speech unit while the speech unit is in use. In case a device changes its functionality dynamically, it generates such a device-document dynamically or updates an existing one, e.g. by replacing/inserting station names, and sends this updated device-document to the speech unit.

Figure 3:
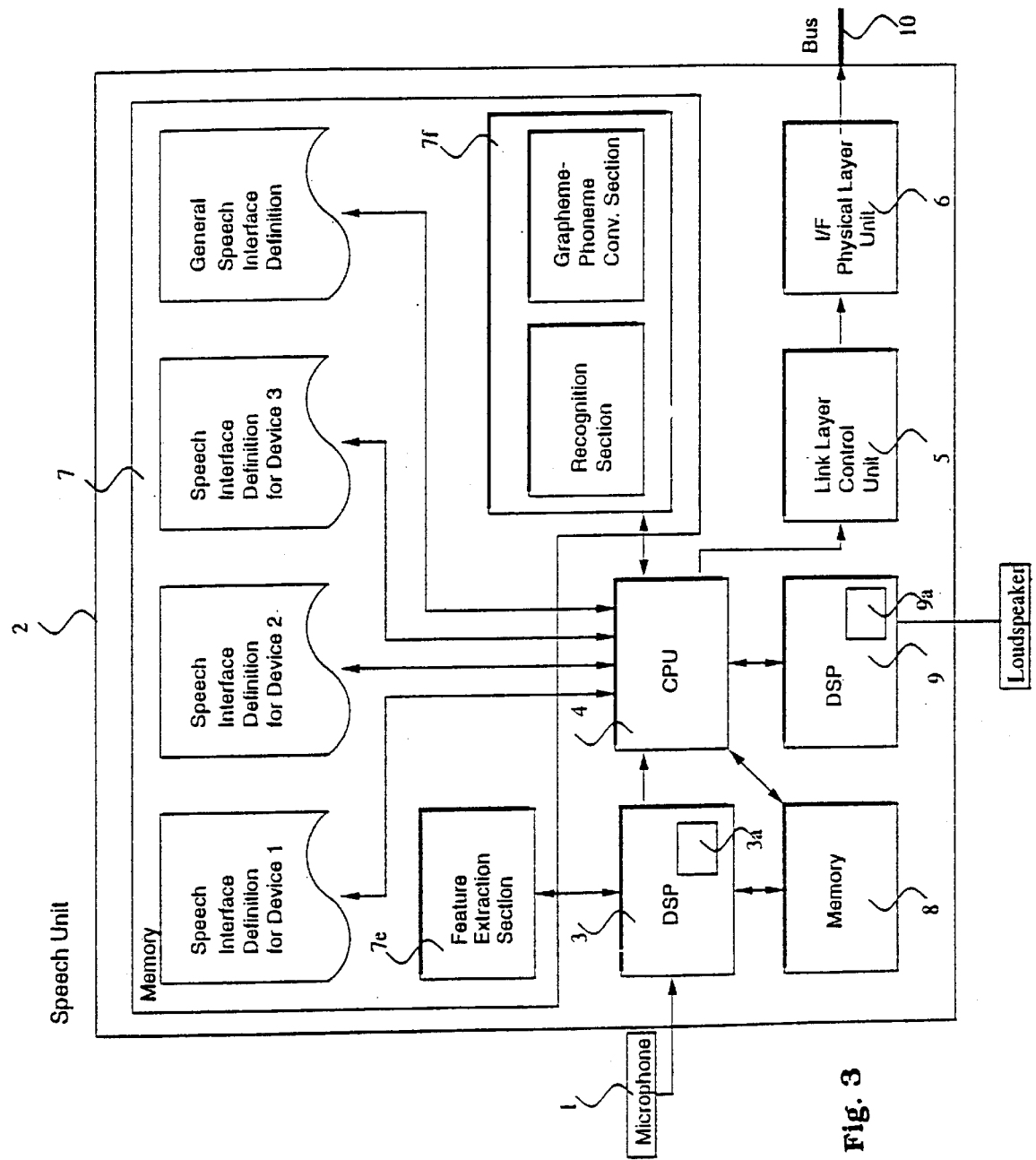

The speech unit 2 according to the prior art is shown in FIG. 3. It is connected to a microphone 1, a loudspeaker and a bus 10. The input signals of the microphone 1 are processed in a digital signal processor 3 with a built-in memory 3a before they are fed to a CPU 4 that outputs its calculation results via a digital signal processor 9 with a built-in memory 9a to the loudspeaker and via a link layer control unit 5 and an I/F physical layer unit 6 to the bus 10. The digital signal processor 3 and the CPU 4 can access a memory 8 which stores all information needed for the process control. Furtheron, the digital signal processor 3 accesses a feature extraction section 7e of a memory 7 that stores all information needed for the speech recognition and synthesis. The CPU 4 accesses a recognition section and grapheme/phoneme conversion section 7f as well as single speech interface definitions for several devices and a general speech interface definition which are respectively separately stored within the memory 7.

Figure 1:
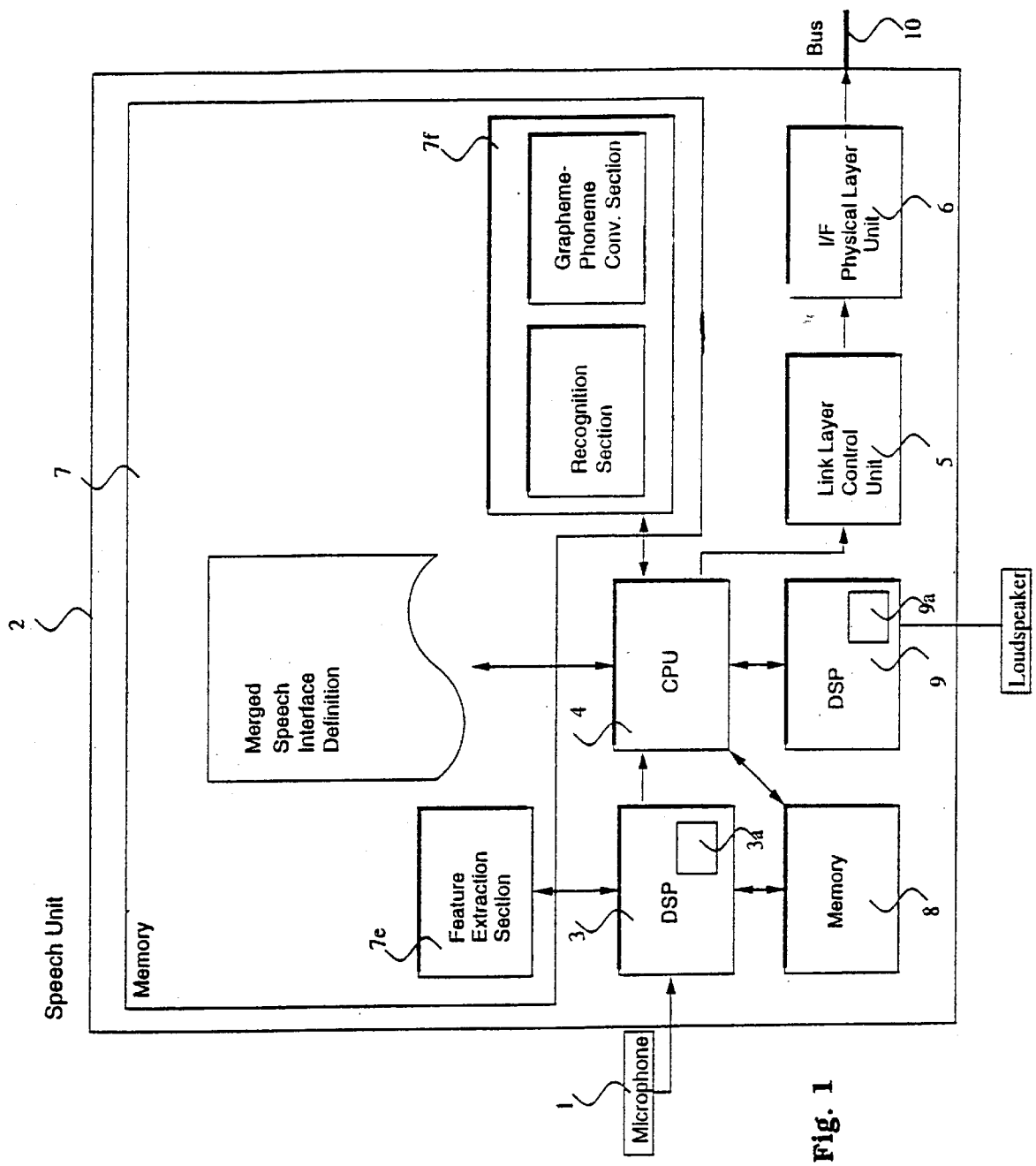
FIGS. 1 to 3 show functional block diagrams of a speech unit according to the prior art, a speech unit according to the present invention and a network device according to the present invention.

The speech unit 2 according to the present invention shown in FIG. 1 is basically build in the same manner as the speech unit 2 according to the prior art, but it comprises one merged speech interface definition within the memory 7 instead of several single speech interface definitions, each for every device, and one general speech interface definition. This merged interface definition corresponds to the general document described in the above description.

Figure 2:
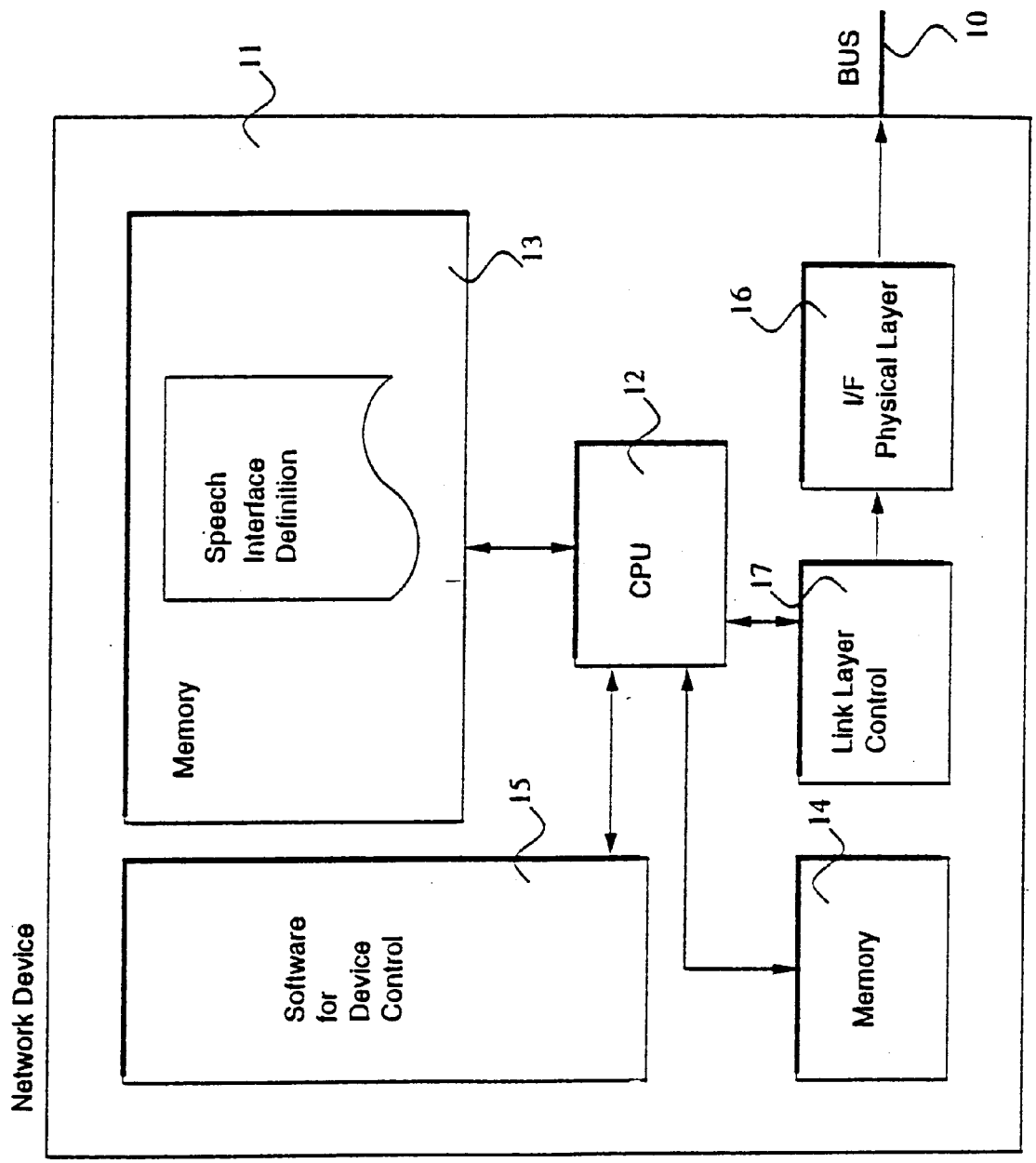

FIG. 2 shows a network device 11 according to the present invention regarding its functionality in connection with the present invention. The network device 11 comprises a CPU 12 that is in interaction with a software for device control 15, a memory 14, a link layer control unit 17 and an I/F physical layer 16 to output some information to the bus 10. Furtheron, the CPU can interact with a memory 13 storing the speech interface definition according to the prior art, i.e. storing the device-document or device-documents according to the present invention.

Of course, as mentioned above, the network device 11 needs not necessarily to have a memory 13 with speech interface definition included, but the speech interface definition of the network device 11 can also be supplied via a speech interface definition supply device which can be accessed from a speech unit 2 according to the present invention.

What is claimed is:

1. Method to control a network device connected to a network with a speech unit within said network that translates user-commands into user-network-commands to control said network device via said network, comprising the steps of:

receiving at least one device-document that contains a language of a corresponding network device, said language comprises at least one pair of an user-command interpretation element and an associated user-network-command;

adapting a general document comprising a language of said speech unit with a received device-document, said language of said speech unit is structured like said language of a device-document, the general document being adapted by updating said language of said speech unit to include all pairs of an user-command interpretation element and an associated user-network-command of the language of said speech unit and of the language of the newly received device-document, wherein all user-commands of the pairs of an user-command interpretation element and an associated user-network-command which respective user-command interpretation elements are included in an intersection of said language of said speech unit and of the language of the newly received device-document get translated into a corresponding user-network-command on the basis of all pairs of an user-command interpretation element and an associated user-network-command included in said general document and a selection procedure and;

translating a received and recognized spoken user-command into a corresponding user-network-command on the basis of all pairs of an user-command interpretation element and an associated user-network-command included in said general document.

2. Method according to claim 1, characterized by the following steps to adapt said general document:

determining whether the language of the speech unit (L) and the language (L1, L2) of a newly received device-document have at least one similar user-command interpretation element;

in case of no similar user-command interpretation elements updating said language (L) of said speech unit to include the join of all pairs of an user-command interpretation element and an associated user-network-command of the language of said speech unit and of the language (L1, L2) of the newly received device-document; and in case of at least one similar user-command interpretation element updating said language (L) of said speech unit to include all pairs of an user-command interpretation element and an associated user-network-command of said language (L) of said speech unit and of the language (L1, L2) of the newly received device-document that are not similar and at least all pairs of an user-command interpretation element and an associated user-network-command of said language (L) of said speech unit and of the language (L1, L2) of the newly received device-document that are similar with a respective identifier defining the respective associated device.

3. Method according to claim 2, characterized in that said identifier is a device name that is used as prefix and/or appendix to the user-command interpretation element of a respective pair of an user-command interpretation element and an associated user-network-command.

4. Method according to claim 1, characterized in that said selection procedure comprises the following steps:

sending a question to the user which device to use, receiving and recognizing an answer of the user, and selecting the corresponding user-network-command on basis of the recognized answer and all pairs of an user-command interpretation element and an associated user-network-command included in said general document.

5. Method according to claim 1, characterized in that said selection procedure comprises the following steps:

sending a question to the system for the most recently used device, receiving an answer of the system, and selecting the corresponding user-network-command on basis of the recognized answer and all pairs of an user-command interpretation element and an associated user-network-command included in said general document.

6. Method according to claim 1, characterized in that said selection procedure comprises the following steps:

receiving and recognizing an utterance of the user, and selecting the corresponding user-network-command on basis of the recognized answer and all pairs of an user-command interpretation element and an associated user-network-command included in said general document.

7. Method according to claim 1, characterized in that said selection procedure comprises the following steps:

sending a question to the system for the most likely device, receiving an answer of the system, and selecting the corresponding user-network-command on basis of the recognized answer and all pairs of an user-command interpretation element and an associated user-network-command included in said general document.

8. Method according to claim 7, characterized in that said most likely device is determined on basis of the devices that are switched on.

9. Method according to claim 1, characterized in that a device-document is sent from a corresponding device to the speech unit directly after said corresponding device was connected to the network.

10. Method according to claim 1, characterized in that a device-document is sent from a corresponding device to the speech unit after said corresponding device received a user-network-command from the speech unit.

11. Method according to claim 1, characterized in that a device-document is sent from a device-document supply device to the speech unit directly after said corresponding device was connected to the network or said device-document supply device received a user-network-command from the speech unit to supply a particular device-document.

12. Method according to claim 1, characterized in that an initial general document included in a speech unit is empty.

13. Method according to claim 1, characterized in that an initial general document included in a speech unit includes a basic set of pairs of an user-command interpretation element and an associated user-network-command.

14. Method according to claim 13, characterized in that said basic set of pairs of an user-command interpretation element and an associated user-network-command defines a default grammar for the wording of utterances.

15. Method according to claim 1, characterized in that an user-command interpretation element comprises a vocabulary element.

16. Method according to claim 1, characterized in that an user-command interpretation element comprises a definition of a grammar of possible continous user utterances dependent on keywords and/or category identifiers.

17. Method according to claim 1, characterized in that an user-command interpretation element comprises a pronunciation definition.

18. Method according to claim 17, characterized in that said pronunciation definition is associated with the language of a certain device.

19. Method according to claim 17, characterized in that said pronunciation definition is associated with the language of a number of devices.

20. Method according to claim 1, characterized in that an user-command interpretation element comprises a grammar for at least one word sequence.

21. Method according to claim 1, characterized in that an user-command interpretation element comprises rules that define a mapping between word sequences and concepts associated to a certain user-command.

22. Method according to claim 1, characterized in that an user-command interpretation element comprises the same information as another pair of an user-command interpretation element and an associated user-network-command for another spoken language.

23. Method according to claim 1, characterized in that an user-command interpretation element comprises standardized information about the device category and/or about its functionality.

24. Method according to claim 1, characterized in that said language of a network device or of said speech unit comprises a reasoning part which, based on information about the category and/or functionality of a network device, allows the speech unit to send several different user-network-commands to one or more network devices after receiving one user-command.

* * * * *